United States Patent

Witt et al.

[15] 3,694,669

[45] Sept. 26, 1972

[54] TIMING CIRCUIT FOR A PROGRAMMABLE TIMER

[72] Inventors: Allan E. Witt, Fairfield; George M. Suhm, Bridgeport, both of Conn.

[73] Assignee: Food Automation Service Techniques Inc., Bridgeport, Conn.

[22] Filed: April 27, 1971

[21] Appl. No.: 137,806

[52] U.S. Cl.............307/252 F, 307/252 K, 307/293, 307/305, 219/492

[51] Int. Cl.............................................H03k 17/00

[58] Field of Search....307/252 F, 252 J, 252 K, 305, 307/293, 288, 287, 283, 301; 219/492

[56] References Cited

UNITED STATES PATENTS

| | | | |
|---|---|---|---|
| 3,486,041 | 12/1969 | Thompson | 307/252 J |
| 3,573,652 | 4/1971 | Charters | 307/288 |
| 3,439,237 | 4/1969 | Sylvan | 307/252 F |
| 3,517,222 | 6/1970 | Wallentowitz | 307/293 |
| 3,181,009 | 4/1965 | Felcheck | 307/252 F |
| 3,559,072 | 1/1971 | Davisson | 307/293 |

*Primary Examiner*—Rudolph V. Rolinec
*Assistant Examiner*—David M. Carter
*Attorney*—Haynes N. Johnson

[57] ABSTRACT

A timing circuit providing a number of adjustable time intervals by pressing one of a number of timing switches. The circuit includes a DC power supply and a first and a second gating means connected across the power supply. The first gating means includes a bank of timing switches mechanically ganged such that only one switch can be closed at any particular time. Each of the timing switches connects a charging element in a series circuit including a trimmer resistor and connected across the power supply. A programmable unijunction transistor detects the current through the charging element and is turned on when the current reaches a specified value. The programmable unijunction transistor controls a silicon controlled rectifier which shorts the DC power supply. A timing interval is chosen by pressing one of the several timing switches. The chosen timing switch connects the charging element across the DC power supply through a particular trimmer resistor. After the time interval determined by the timing constant of the series circuit including the charging element, the programmable unijunction transistor is turned on. The output signal provided by the turned on programmable unijunction transistor in turn turns on the silicon controlled rectifier to delineate the end of the timing interval started with the closing of one of the timing switches.

3 Claims, 1 Drawing Figure

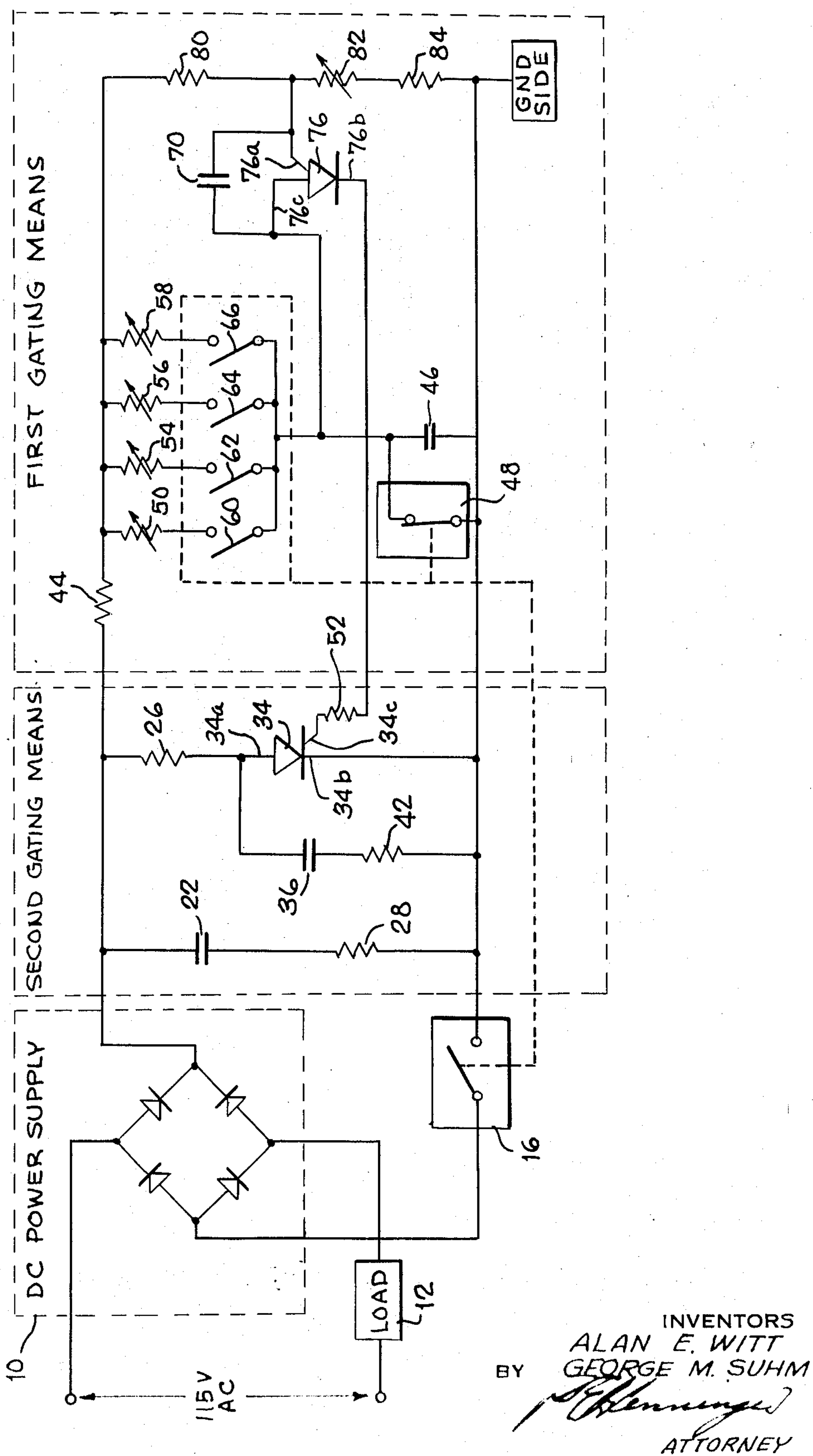
INVENTORS
ALAN E. WITT
GEORGE M. SUHM
BY
ATTORNEY

TIMING CIRCUIT FOR A PROGRAMMABLE TIMER

BACKGROUND AND SUMMARY OF THE INVENTION

The invention is in the field of timing circuits designed to measure preset timing intervals. Examples of such timing circuits are Leary U.S. Pat. No. 3,506,881 and Wallentowitz U.S. Pat No. 3,417,296 which disclose transistorized circuits relying on the time constant of capacitors to measure time intervals.

The subject invention relates to a timing circuit providing a number of time intervals selected by closing one of a number of timing switches. In particular the invented timing circuit includes a first and a second gating means each connected across a DC power supply through an off-on switch. The first gating means includes a charging element which can be connected across the DC power supply through one of the timing switches which are mechanically ganged such that only one timing switch can be closed at any particular time. Each of the timing switches has an associated trimmer resistor for fine adjustment of the several available timing intervals. The time constant of the charging element and the connected trimmer resistor defines the current through the charging element which is detected by means of a programmable unijunction transistor which controls a silicon controlled rectifier forming a part of the second gating means.

BRIEF DESCRIPTION OF THE DRAWING

FIG. 1 is a schematic diagram of the invented timing circuit.

DETAILED DESCRIPTION

The purpose of the invented timing circuit is to provide a number of time intervals selectable by pressing one of a number of special keys which control timing switches. Each key provides a timing interval adjustable over a range of time, for example, from 1 to 60 minutes. Any number of keys may be used with the timing circuit, but only one key may be pressed at a time. The keys may be marked with either time or with some other identification which simplifies the use of the timing circuit; for example, if the invented timing circuit is used to time cooking implements, the special keys may be marked with the names of the products which are to be cooked.

In particular, the invented timing circuit shown in FIG. 1 includes a DC power supply 10 serving as a source of DC potential, and an off-on switch 16 connecting the DC power supply 10 across a first gating means and across a second gating means. The DC power supply 10 is connected to an AC source such as a standard 115 volt power line, and an AC load 12 is located on one leg of the power line, in series with the DC supply 10.

The first gating means includes a charging capacitor 46 serving as a charging element, and a programmable unijunction transistor 76 (such as a Unitrode U13T1 or a Unitrode U13T2) serving as a first gating element. When the off-on switch 16 is closed, to connect the first gating means across the DC supply 10, current from the DC supply flows through a voltage dropping resistor 44 and through one of a series of time control trimmer resistors 50, 54, 56, and 58, to charge the charging capacitor 46. The trimmer resistors 50, 54, 56, and 58 are connected to the charging capacitor 46 through respective time control switches 60, 62, 64, and 66, which are mechanically ganged such that only one can be ON at any particular time. Thus, only a selected one of the resistors 50, 54, 56, and 58 can be connected to the charging capacitor 46 at any one time.

At first the current across the charging capacitor 46 is not at a level which can turn on the programmable unijunction transistor 76, and the transistor 76 is in its normally nonconductive state. While the off-on switch 16 remains closed, the charge on the capacitor 46 continues building up, and after a time interval determined by the time constant of the selected resistor of the series of adjustable resistors 50, 54, 56, and 58 and the capacitor 46, the current across the capacitor 46 reaches a value sufficient to turn on the programmable unijunction transistor 76 and cause it to commence conducting. The programmable unijunction transistor 76 is biased by means of a voltage divider composed of resistors 80, 82 and 84 connected across the DC supply 10 through the dropping resistor 44.

When the programmable unijunction transistor 76 commences conducting, the signal at its output terminal **76*b* (the cathode) is applied to the trigger terminal 34*c* (the gate) of the SCR 34. The SCR 34 may be a silicon controlled rectifier of the type Unitrode ID100 or Unitrode ID200. The terminals 76*b* and 34*c* are connected by means of a voltage dropping resistor 52. The current signal at the trigger terminal 34*c* causes the normally closed SCR 34 to commence conducting, and the conducting state of the SCR 34 causes a short circuit across the power supply 10 and activates the load 12. Resistor 26 allows a small amount of current through to the trigger terminal 34*c* of the SCR 34 to keep the SCR 34** conducting once it has commenced conducting.

The load 12 is terminated by opening the off-on switch 16. A bleeding switch 48 is mechanically connected with the off-on switch 16 to be in a complementary state therewith, i.e., to open when the off-on switch 16 closes, and to close when the off-on switch 16 opens so as to discharge the capacitor 46.

In operation of the timing circuit of FIG. 1, a desired pre-set time is selected by means of adjusting a trimmer resistor 82 thereby changing the bias on the gate terminal **76*a* of the programmable unijunction transistor 76. A desired time interval may then be selected by means of keying one of the time control switches 60, 62, 64, and 66 connected in series with a trimmer resistor; i.e., each switch in the bank of time control switches 60, 62, 64, and 66 has a trimmer resistor in series with that switch. The switches, such as Switchcraft series 6500, are mechanically connected so only one switch may be keyed at a time. The device may have any number of time control switches. Adjustment of the trimmer resistors 50, 54, 56, and 58 gives the desired time for the switch that the trimmer resistor is in series with. Then the selected interval commences with the closing of the off-on switch 16. When the charge on the capacitor 46 reaches a pre-determined value determined by the bias on terminal 76*a* of the programmable unijunction transistor 76 by means of a voltage divider composed of resistors 80, 82, and 84** connected from the dropping resistor 44 to the ground side of the circuit, the programmable unijunction transistor 76 commences conducting and turns on the SCR 34. Then the SCR 34 commences conducting, causing a short circuit across the power supply 10 and activating the load 12.

Transient protection for the circuit is provided by a capacitor 22 and a resistor 28 connected in series across DC power supply 10, a capacitor 36 and resistor 42 connected in series from the terminal 34*a* (anode) of the SCR 34 to the cathode terminal 34*b* of the SCR 34, and a capacitor 70 from the terminal 76*a* of the programmable unijunction transistor 76 to the anode terminal 76*c* of the programmable unijunction transistor 76.

We claim:

1. A timing circuit operable on AC house current and adapted to accurately and serially time a plurality of different selectable cooking cycles, each said cycle being repeatable and individually adjustable, said circuit including an AC load to be actuated at the end of the selected cooking cycle, a rectifier bridge circuit, a precision gate circuit, a shorting circuit controlled by said gate circuit, said shorting circuit being in series with said AC load and across said rectifier bridge circuit to short same and thereby actuate said AC load, a plurality of individually adjustable RC circuits to control said gate circuit, a gang switch for selectively interconnecting to said gate circuit only one of said RC circuits at a time, said gate circuit including an adjustable voltage divider and a programmable unijunction transistor having its emitter biased by the potential on the capacitor in said selected RC circuit and its base potential controlled by said voltage divider, whereby said transistor will conduct at the end of the set time of a selected RC circuit and so actuate said shorting circuit, and each of said plurality of individually adjustable RC circuits being adjusted to provide a time corresponding to a desired cooking time, whereby the operator may actuate said gang switch to select the time for the desired cooking cycle and thereby commence operations of said timing circuit.

2. A timing circuit as in claim 1 in which said shorting circuit includes an SCR and said gate circuit controls the gate of said SCR 3. A timing circuit as in claim 1 including a switch for initially actuating same.

* * * * *